United States Patent
Petsche et al.

(10) Patent No.: US 8,106,880 B2
(45) Date of Patent: Jan. 31, 2012

(54) SHARING A VIDEO DISPLAY BETWEEN TELEPHONY AND COMPUTING DEVICES

(75) Inventors: Thomas Anthony Petsche, Neshanic Station, NJ (US); Michael Vernick, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 961 days.

(21) Appl. No.: 11/692,077

(22) Filed: Mar. 27, 2007

(65) Prior Publication Data
US 2008/0239148 A1 Oct. 2, 2008

(51) Int. Cl.
*G09G 5/00* (2006.01)
(52) U.S. Cl. ............ 345/156; 710/72; 710/73; 709/203; 709/204
(58) Field of Classification Search .................. 345/156; 710/72, 73; 709/203, 204, 205
See application file for complete search history.

(56) References Cited

U.S. PATENT DOCUMENTS

| 6,205,342 B1 * | 3/2001 | Oakes et al. ................. 455/566 |
| 2005/0104852 A1 * | 5/2005 | Emerson et al. .............. 345/157 |
| 2005/0198578 A1 | 9/2005 | Agrawala et al. |
| 2007/0022176 A1 * | 1/2007 | Kobayashi .................... 709/217 |

* cited by examiner

*Primary Examiner* — Amare Mengistu
*Assistant Examiner* — Koosha Sharifi-Tafreshi
(74) *Attorney, Agent, or Firm* — Maldjian Law Group LLC; John P. Maldjian, Esq.

(57) ABSTRACT

An apparatus and method are disclosed that enable the sharing, between a telephone and a computer, of input peripherals such as a keyboard and mouse and of output peripherals such as a video display. Historically, a telephone and a computer have possessed different interfaces with their user and with peripheral devices. Therefore, except where the telephone functionality is in the form of a softphone implemented on a computer, the telephone in the prior art is often incapable of sharing certain peripherals with a physically-adjacent computer. The telephone device of the illustrative embodiment enables sharing between the telephone and a computer, in contrast to sharing peripherals between computers in the prior art. The telephone device is able to determine which user inputs from a shared keyboard or mouse are intended for which data-processing device (i.e., the telephone device itself or the computer), and to transmit displayable signals from both the telephone device and computer to a shared video display device.

19 Claims, 5 Drawing Sheets

SHARING A VIDEO DISPLAY BETWEEN TELEPHONY AND COMPUTING DEVICES

FIELD OF THE INVENTION

The present invention relates to telecommunications in general, and, more particularly, to sharing a video display across multiple data-processing devices.

BACKGROUND OF THE INVENTION

A person in the workplace typically has a telephone at his or her disposal, along with one or more personal computers. Usually these telephony and computing devices, or generally "data-processing devices," are physically distinct from one another. Additionally, some or all of the devices associated with a particular user might be networked together, either by direct physical connection (e.g., universal serial bus cable, etc.) or through a local area network (e.g., Ethernet-based network, etc.).

Sometimes, a set of data-processing devices can be configured to share common peripheral devices such as a keyboard, a mouse, and a video display. FIG. 1 depicts telecommunications system 100 in the prior art, in which such a shared configuration is present. System 100 comprises input devices 101-1 through 101-M, wherein M is a positive integer; video display device 102; device switch 103; first data-processing device 104-1; additional data-processing devices 104-2 through 104-N, wherein N is a positive integer greater than one; and telecommunications network 105, interconnected as shown.

Input device 101-m, where m can be equal to 1 through M, is a peripheral device that is used to accept external data and to provide that data to one or more data-processing devices that process the data provided, such as devices 104-1 through 104-N. The external data can come from different sources, including a user, human or machine, of one or more of the data-processing devices. Input devices 101-1 through 101-M can be one or more of a keyboard, a keypad, a mouse, a scanner, a webcam, a microphone, an analog-to-digital (A/D) converter, a barcode reader, a joystick, a touch screen, a digitizing tablet, an optical pen, and so forth. In telecommunications system 100, input device 101-1 is a keyboard, which is a character and user-selection input device as is well known in the art; device 101-1 receives input from a user and transmits keyboard signals representing that input to a data-processing device.

Video display device 102 is a peripheral device that enables a user to visually perceive the data processed by one or more data-processing devices (e.g., devices 104-1 through 104-N, etc.). Video display device 102 receives displayable, electromagnetic signals and converts those electromagnetic signals into visual signals that are displayed for the user.

Device switch 103 is a hardware device that allows a user to control and monitor multiple data-processing devices from a single set of input devices, the set typically comprising a keyboard, a video display, and a mouse. One example of device switch 103 in the prior art is a KVM switch, where "KVM" is an initialism for "Keyboard, Video, Mouse." Multiple personal computers can be connected to a KVM switch, along with the previously-identified peripheral devices.

Data-processing devices 104-1 through 104-N include personal computers and workstations. These devices can be networked together through telecommunications network 105, which typically comprises a local-area network.

Although device switch 103 enables the depicted data-processing devices to share at least some of the same input and output peripherals, not all combinations of data-processing devices lend themselves to a straightforward sharing of peripherals. And often there are some combinations of data-processing devices that are flatly inconsistent with at least some of the peripheral-sharing techniques in the prior art.

What is needed is a technique that enables peripheral sharing within additional combinations of data-processing devices, without some of the disadvantages in the prior art.

SUMMARY OF THE INVENTION

The present invention enables the sharing, between a telephone and a computer, of input peripherals such as a keyboard and mouse and of output peripherals such as a video display. A telephone and a computer are physically-distinct data-processing devices which, for various reasons, have evolved differently; consequently, they possess different interfaces with their user and with peripheral devices. Therefore, except where the telephone functionality is in the form of a softphone implemented on a computer, the telephone in the prior art is often incapable of sharing certain peripherals with a physically-adjacent computer. The illustrative embodiment provides a technique to enable sharing between a telephone and computer, in contrast to sharing peripherals purely between computers in the prior art.

In accordance with the illustrative embodiment, an enhanced telephone device is interposed between (i) the computer and (ii) the keyboard, mouse, and video display devices. The telephone device receives the keystrokes and mouse clicks generated by the user and either passes the received signals through to the computer or intercepts the received signals for the telephone's own use, such as for placing a call or handling a call in general. Additionally, the telephone device receives video signals from the computer and, along with any video signals generated by the telephone itself, transmits those displayable signals to a shared video display device for display to the user. In short, the telephone device of the illustrative embodiment is able to determine which user inputs are intended for which data-processing device (i.e., the telephone device itself or the computer); the telephone device also able to modify the displayable signal from the computer before transmitting the signal to the video display device, with or without the displayable signal that represents the telephone's own graphical user interface.

The illustrative embodiment of the present invention comprises: a first receiver for receiving a first user-input signal from a first user-input device; a first transmitter for transmitting a first displayable signal to a video display device, wherein the first displayable signal correlates to the first user-input signal; a second transmitter for transmitting the first user-input signal to a second data-processing device; and a processor for selecting between (i) the transmission of the first displayable signal and (ii) the transmission of the first user-input signal, based on the first user-input signal.

DETAILED DESCRIPTION

Figure 1:
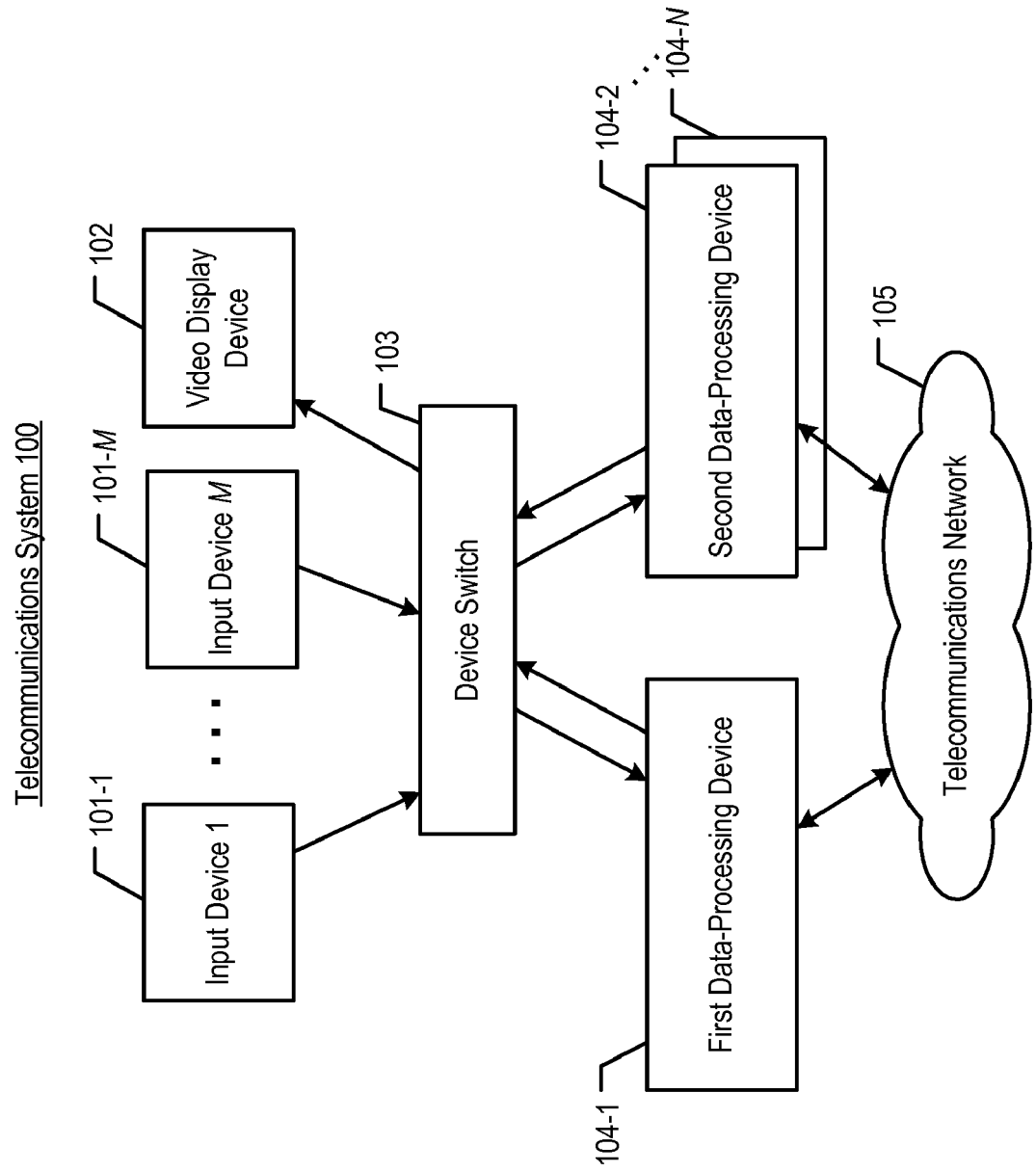
FIG. 1 depicts telecommunications system 100 in the prior art.
Figure 2:
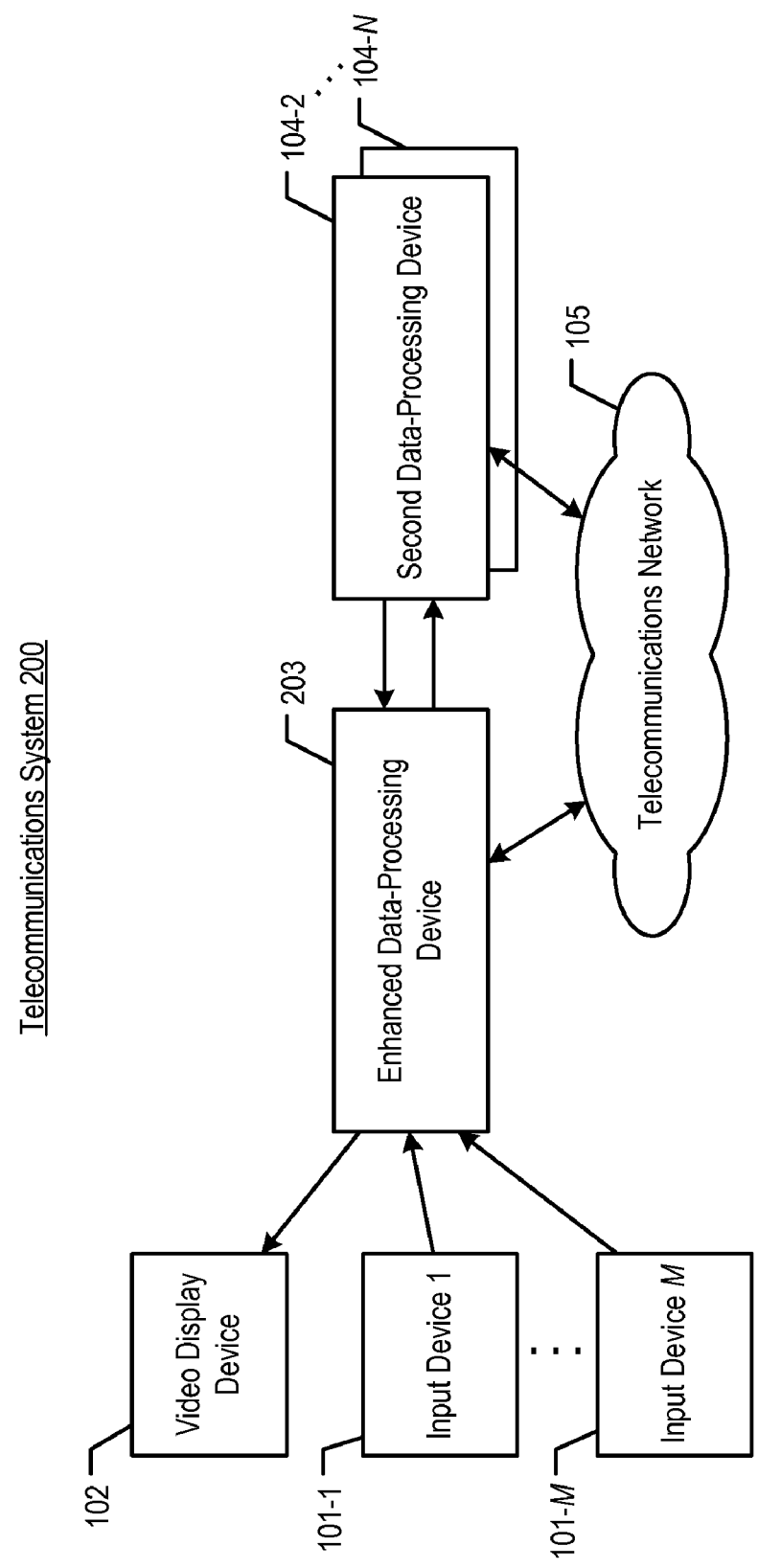
FIG. 2 depicts telecommunications system 200 in accordance with the illustrative embodiment of the present invention.

FIG. 2 depicts telecommunications system 200 in accordance with the illustrative embodiment of the present invention. System 200 comprises input devices 101-1 through 101-M, wherein M is a positive integer; video display device 102; telecommunications network 105; enhanced data-processing device 203; and additional data-processing devices 104-2 through 104-N, wherein N is a positive integer greater than one. The elements in system 200 are interconnected as shown.

Input devices 101-1 through 101-M, video display device 102, data-processing devices 104-2 through 104-N, and network 105 are well-known in the art and have already been described in this specification. It will be clear to those skilled in the art how to make and use these elements of system 200.

Enhanced data-processing device 203 comprises the processing portion of a telephone deskset, in accordance with the illustrative embodiment of the present invention. The salient components of device 203 are described below and with respect to FIG. 3. Device 203 receives input from its user via one or more input devices 101-1 through 101-M, as well as through an optional handset. Based on the received input signals, device 203 performs one or more call processing-related functions, in well-known fashion. Device 203 provides information to its user via video display 102, as well as through other output peripherals not shown, such as a loudspeaker or handset speaker, in well-known fashion. Additionally, device 203 is able to communicate with other telephone devices through telecommunications network 105, in well-known fashion. In accordance with the illustrative embodiment, device 203 also performs additional functions that comprise the tasks that are described with respect to FIGS. 4 and 5.

Enhanced data-processing device 203 as depicted is the processing portion of a telephone deskset. In some alternative embodiments, however, device 203 can be part of another type of telecommunications terminal, such as another type of telephone, or can be another type of data-processing device entirely, such as a personal computer or workstation, as those who are skilled in the art will appreciate. Moreover, in the illustrative embodiment, device 203 is connected to a single data-processing device 104-2, which is a personal computer. It will be clear to those skilled in the art, however, how to make and use illustrative embodiments of the present invention in which device 203 is connected to more than one data-processing device, such as personal computer 104-2, workstation 104-3, and so forth.

Figure 3:
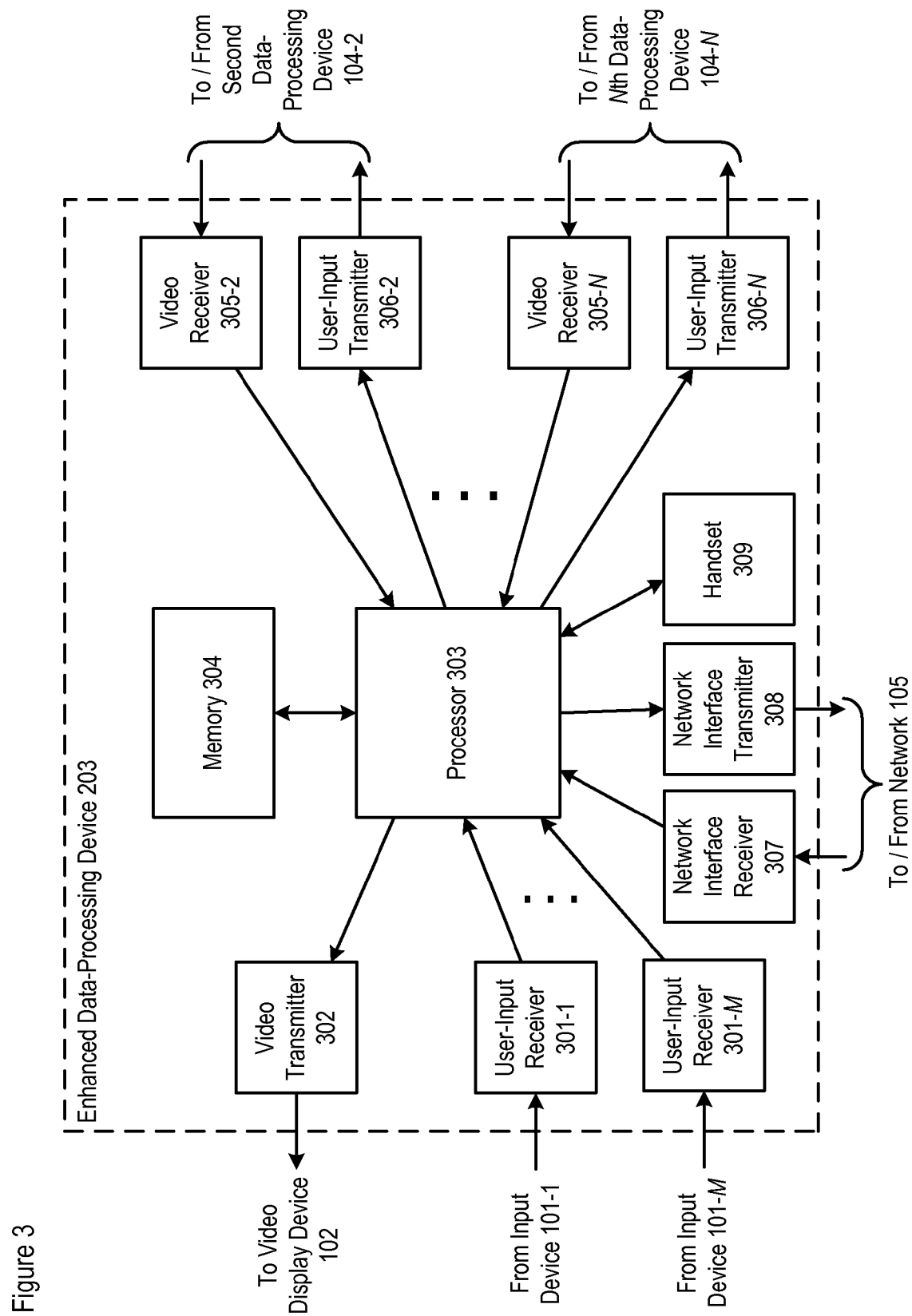
FIG. 3 depicts the salient components of enhanced data-processing device 203 of system 200.

FIG. 3 depicts the salient components of enhanced data-processing device 203, in accordance with the illustrative embodiment of the present invention. Device 203 comprises user-input receivers 301-1 through 301-M, video transmitter 302, processor 303, memory 304, video receivers 305-2 through 305-N, user-input transmitters 306-2 through 306-N, network interface receiver 307, network interface transmitter 308, and handset 309, interconnected as shown. The components of device 203 as depicted in FIG. 3 collectively execute the tasks described below and with respect to FIGS. 4 and 5. However, it will be clear to those who are skilled in the art, after reading this specification, how to adapt a different configuration of components than depicted, to execute the tasks described below.

User-input receivers 301-1 through 301-M receive signals from M input devices that are utilized by a user of device 203 and forward the information encoded in the signals to processor 303, in well-known fashion. In accordance with the illustrative embodiment, receiver 301-1 receives signals from a keyboard and receiver 301-2 receives signals from a mouse; both interfaces are universal serial bus (USB)-based. As those who are skilled in the art will appreciate, in some alternative embodiments, each receiver 301-m can be based on a different type of interface than USB (e.g., DIN, RS-232, IEEE-1394, etc.). Additionally, device 203 can have a different number of receive interfaces or can receive signals from a different combination of input devices (e.g., a keypad, a touch screen, etc.), in some other alternative embodiments. It will be clear to those skilled in the art, after reading this specification, how to make and use user-input receivers 301-1 through 301-M.

Video transmitter 302 receives information from processor 303, and outputs signals that encode this information to video display 102, in well-known fashion. The information that transmitter 302 receives originates either from processor 303 or from any of the data-processing devices 104 that are connected to device 203 via video receivers 305-2 through 305-N, which are described below. In accordance with the illustrative embodiment, transmitter 302 is based on a Digital Visual Interface (DVI), as is known in the art; however, as those who are skilled in the art will appreciate, in some alternative embodiments, transmitter 302 can be a different type of video interface such as a Video Graphics Array (VGA) interface, as is also known in the art. Although only a single interface (i.e., transmitter 302) to an output device is depicted in FIG. 3, in some embodiments, device 203 has interfaces to multiple output devices (e.g., a first display, a second display, a speaker, etc.). It will be clear to those skilled in the art, after reading this specification, how to make and use video transmitter 302.

Processor 303 is a general-purpose processor that is capable of receiving information from user-input receiver 301-m, video receiver 305-n, network interface receiver 307, and handset 309; reading data from and writing data into memory 304; executing some or all of the tasks described below and with respect to FIGS. 4 and 5; and transmitting information to video transmitter 302, user-input transmitter 306-n, network interface transmitter 308, and handset 309. In some alternative embodiments of the present invention, processor 303 might be a special-purpose processor. In either case, it will be clear to those skilled in the art, after reading this disclosure, how to make and use processor 303.

Memory 304 is a device that stores the instructions and data used by processor 303. Memory 304 might be any combination of dynamic random-access memory (RAM), flash memory, disk drive memory, and so forth. It will be clear to those skilled in the art how to make and use memory 304.

Video receivers 305-2 through 305-N receive video-related signals from data-processing devices 104-2 through 104-N, respectively, and forward the information encoded in the signals to processor 303. In accordance with the illustrative embodiment, each video receiver 305-n is based on a Digital Visual Interface (DVI), as is known in the art. As those who are skilled in the art will appreciate, however, transmitter 302 can be based on a different type of video interface such as a Video Graphics Array (VGA) interface, in some alternative embodiments. Although in the illustrative embodiment only a single interface (i.e., video receiver 305-2) receives signals from a video-generating device (i.e., personal computer 104-2), in some alternative embodiments device 203 will have receive interfaces from multiple video-generating devices (e.g., personal computer 104-2, workstation 104-3, etc.). It will be clear to those skilled in the art, after reading this specification, how to make and use video receivers 305-2 through 305-N.

User-input transmitters 306-2 through 306-N receive information from processor 303, and outputs signals that encode this information to data-processing devices 104-2 through 104-N. The information that each transmitter 306-n receives originates either from processor 303 or from any of input devices 101 that are connected to device 203 via input receivers 301-1 through 301-M, which have already been described. In accordance with the illustrative embodiment, transmitter 306-2 transmits signals to personal computer 104-2, and the interface is universal serial bus (USB)-based. As those who are skilled in the art will appreciate, in some alternative embodiments, each user-input transmitter 306-n can be based on a different type of interface than USB. In some other alternative embodiments, device 203 can have a different number of user-input transmit interfaces. It will be clear to those skilled in the art, after reading this specification, how to make and use user-input transmitters 306-2 through 306-N.

Network interface receiver 307 receives signals from telecommunications network 105 and forwards the information encoded in the signals to processor 303, in well-known fashion. Network interface transmitter 308 receives information from processor 303, and outputs signals that encode this information to network 105, in well-known fashion. In accordance with the illustrative embodiment, receiver 307 and transmitter 308 are Ethernet-based, as is known in the art. As those who are skilled in the art will appreciate, in some alternative embodiments, receiver 307 and transmitter 308 can be based on a different set of protocols than Ethernet. It will be clear to those skilled in the art how to make and use receiver 307 and transmitter 308.

Handset 309 receives and encodes audio signals from a user and forwards the encoded information to processor 303, in well-known fashion. Handset 309 also receives information from processor 303, and outputs audio signals that represent this information to a user, in well-known fashion. As those who are skilled in the art will appreciate, in some alternative embodiments, handset 309 is not present, in which case device 203 exchanges audio signals with a user through other means, such as by receiving signals from a microphone via one of user-input receivers 301. It will be clear to those skilled in the art how to make and use handset 309.

Figure 4:
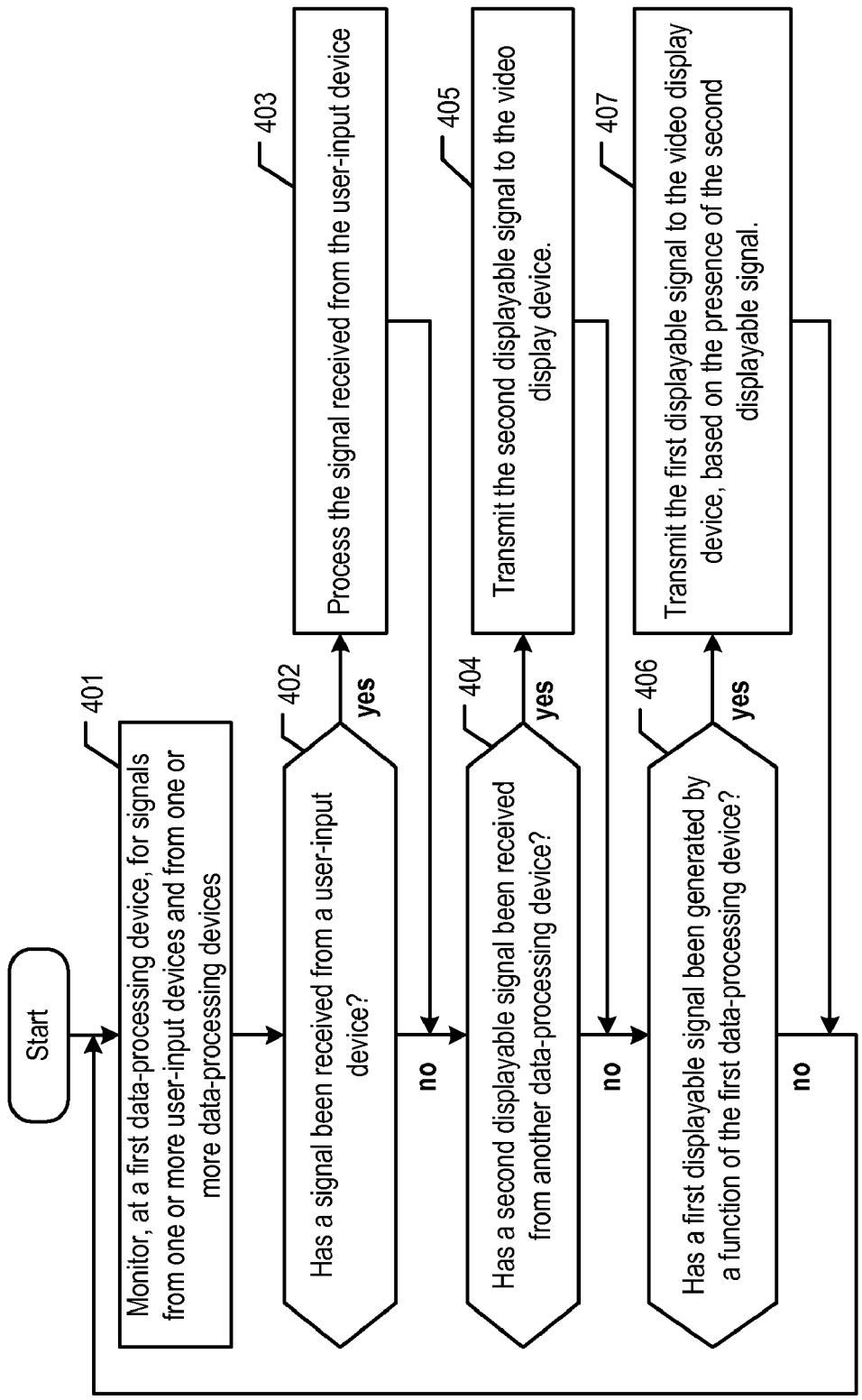
FIG. 4 depicts a flowchart of the salient tasks performed by enhanced data-processing device 203, in accordance with the illustrative embodiment of the present invention.

FIG. 4 depicts a flowchart of the salient tasks performed by enhanced data-processing device 203, in accordance with the illustrative embodiment of the present invention. For pedagogical purposes, enhanced data-processing device 203 comprises the processing portion of a telephone deskset, is connected to data-processing device 104-2, a personal computer, and shares the same keyboard, mouse, and video display with device 104-2. As those who are skilled in the art will appreciate, some of the tasks that appear in FIG. 4 can be performed in parallel or in a different order than that depicted.

At task 401, device 203 monitors for signals from input devices 101-1 and 101-2 (i.e., keyboard and mouse, respectively) and from data-processing device 104-2 (i.e., a personal computer). While monitoring for signals from the other devices, device 203 might receive an input signal from the keyboard or mouse (i.e., via receiver 301-1 or 301-2) or a displayable signal from the personal computer (i.e., via receiver 305-1). As those who are skilled in the art will appreciate, device 203 is able to monitor and receive signals from other devices as well.

At task 402, if a signal has been received from input device 101-m, task execution proceeds to task 403. Otherwise, task execution proceeds to task 404.

At task 403, device 203 processes the signal received from input device 101-m. Task 403 is described below and with respect to FIG. 5.

At task 404, if a displayable signal has been received from data-processing device 104-n, task execution proceeds to task 405. Otherwise, task execution proceeds to task 406.

At task 405, device 203 transmits the received displayable signal to video display device 102.

Device 203 is also able to generate displayable signals, some of which are correlated to one or more user-input signals. For example, each displayable signal can be the result of device 203 having received a user-input signal or a signal having been generated by a processing function executing at device 203, or both. At task 406, if device 203 has generated a displayable signal, task execution proceeds to task 407. Otherwise, task execution proceeds back to task 401.

At task 407, device 203 transmits the self-generated displayable signal to video display device 102, based on the presence of a displayable signal being received from data-processing device 104-n, if in fact a displayable signal is being received. Task execution then proceeds back to task 401.

The following are examples of how displayable signals from both device 104-2 and device 203 might interact with each other. As a first example, when personal computer device 104-2 is not operating (or is not present), telephone device 203 outputs a signal to video display device 102 that comprises the graphical user interface (GUI) for device 203. In that case, device 203 uses the user-input signals received to operate the graphical user interface for the telephone functionality, by providing user-entered parameters for one or more processing functions, such as dialed digits for a call-origination function.

As a second example, when personal computer device 104-2 is operating, telephone device 203 receives the displayable DVI signal from the device 104-2 and transmits the displayable signal to video display device 102.

As a third example, when device 203 needs to display the GUI for its telephone functionality, it modifies the signal from personal computer device 104-2 to superimpose the GUI image over the display image being received from device 104-2. In some embodiments, device 203 is able to receive user-input signals that command the displaying of the telephone GUI when the GUI is not already being displayed.

Figure 5:
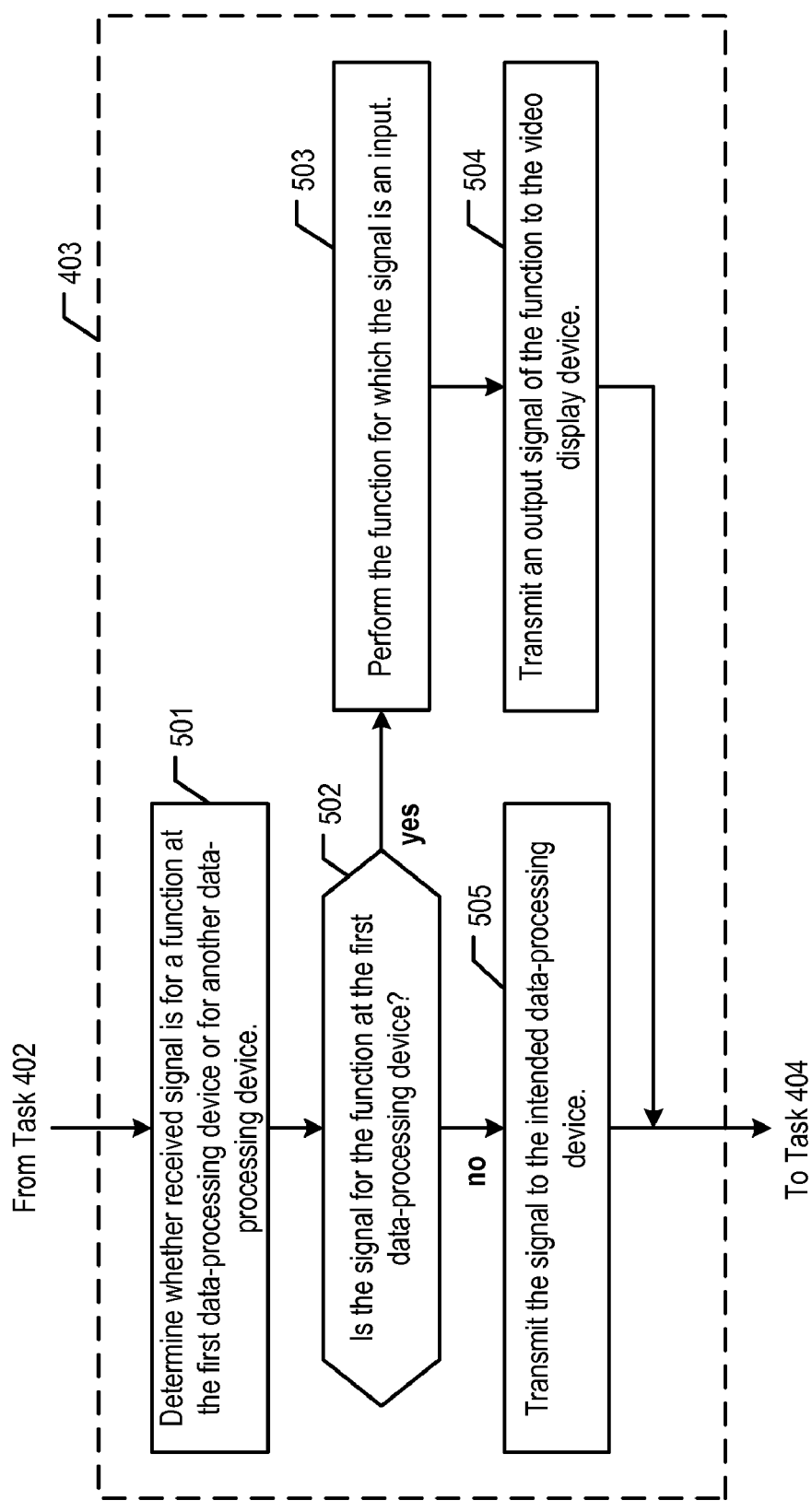
FIG. 5 depicts a flowchart of the salient subtasks performed by enhanced data-processing device 203, in processing the signal received from input device 101-m and as part of task 403.

FIG. 5 depicts a flowchart of the salient subtasks performed by enhanced data-processing device 203, in processing the signal received from input device 101-m (e.g., keyboard, mouse, etc.) and as part of task 403. As those who are skilled in the art will appreciate, some of the tasks that appear in FIG. 5 can be performed in parallel or in a different order than that depicted.

At task 501, device 203 determines whether the signal received at task 401 is intended for a processing function at device 203 itself or for another data-processing device 104-n. It will be clear to those who are skilled in the art how to discern when user-input signals are relevant to device 203 and when those signals are relevant to another device (e.g., device 104-2, etc.). For example, a state machine executing at telephone device 203 can track the type of input the state machine expects and when; any unexpected input can be assumed to be relevant to device 104-2 and then passed to that device.

Device 203 selects whether to use the received signal itself or to transmit the signal to another data-processing device, as determined at task 501. At task 502, if the received signal is for device 203, task execution proceeds to task 503. Otherwise, task execution proceeds to task 505.

At task 503, device 203 performs the processing function for which the received signal is input. For example, device 203 might recognize the received signal as representing one or more dialed digits and, accordingly, invokes a call-origination function to place a call.

At task 504, device 203 transmits an output signal of the performed processing function to video display device 102, in well-known fashion. For example, device 203 might transmit, to display device 102, a displayable signal that represents one or more dialed digits. Task execution then proceeds to task 404.

Alternatively, the user-input signal received at task 401 might be intended for another data-processing device; accordingly, at task 505 device 203 transmits the received signal to the intended data-processing device. For example, the received user-input signal might be intended for a computing function, such as the opening of a word-processing computer file, to execute at personal computer device 104-2. Subsequently, the user-input signal transmitted to device 104-2 results in device 104-2 transmitting back a displayable signal of the contents of the opened word-processing computer file, which displayable signal is received at task 401 and sent to video display device 102.

After task 505, task execution then proceeds to task 404.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A first data-processing device comprising:
   a first receiver for receiving a first user-input signal from a first user-input device;
   a first transmitter for transmitting a first displayable signal to a video display device;
   a second transmitter for transmitting the first user-input signal to a second data-processing device, wherein the first data-processing device is separate from the first user-input device, the video display device, and the second data-processing device;
   a second receiver for receiving a second displayable signal from the second data-processing device; and
   a processor for (a) executing a state machine that determines whether the first user-input signal is intended for the first data-processing device, and for (b) (i) when the first user-input signal is intended for the first data-processing device, processing the first user-input signal, resulting in a first displayable signal that is to be transmitted via the first transmitter to the video display device, and (ii) when the first user-input signal is intended for the second data-processing device, transmitting, via the second transmitter, the first user-input signal to the second data-processing device;
   wherein the first data-processing device is a telephone comprising an external interface to a keyboard and an external interface to a mouse, wherein the telephone enables sharing by the first data-processing device and the second data-processing device of at least one peripheral device, and wherein the first user-input device and the video display device are both peripheral devices,
   and wherein the processor modifies the received second displayable signal, resulting in the first displayable signal such that the first displayable signal comprises at least part of the second displayable signal.

2. The first data-processing device of claim 1 wherein the processor is also for handling a telephone call, wherein the handling results in a third displayable signal for the video display device.

3. The first data-processing device of claim 2 wherein the third displayable signal is of a dialed digit of a telephone number of the telephone call.

4. The first data-processing device of claim 2 wherein the second data-processing device is for performing a computing function, wherein the computing function results in the second displayable signal.

5. The first data-processing device of claim 4 wherein the computing function is the opening of a word-processing computer file and the second displayable signal is of result is of the contents of the word-processing computer file.

6. A system comprising:
   a first user-input device;
   a video display device; and
   a first data-processing device for:
      a) receiving a first user-input signal from the first user-input device, and
      b) executing a state machine that determines whether the first user-input signal is intended for the first data-processing device, and
      c) (i) when the first user-input signal is intended for the first data-processing device, processing the first user-input signal into a first displayable signal that is transmittable to the video display device, and
      (ii) when the first user-input signal is intended for a second data-processing device that is separate from the first data-processing device, transmitting the first user-input signal to the second data-processing device, and
      d) enabling sharing by the first data-processing device and the second data-processing device of at least one peripheral device, wherein the first user-input device and the video display device are both peripheral devices, and
      e) receiving a second displayable signal from the second data-processing device,
   wherein the first data-processing device is a telephone comprising an external interface to a keyboard and an external interface to a mouse, and
   wherein the first data-processing device is also for modifying the received second displayable signal, resulting in the first displayable signal such that the first displayable signal comprises at least part of the second displayable signal.

7. The system of claim 6 wherein the first data-processing device is also for handling a telephone call, wherein the handling results in a third displayable signal for the video display device.

8. The system of claim 7 wherein the third displayable signal is of a dialed digit of a telephone number of the telephone call.

9. The system of claim 7 wherein the second data-processing device is for performing a computing function, wherein the computing function results in the second displayable signal.

10. The system of claim 9 wherein the computing function is the opening of a word-processing computer file and the second displayable signal is of result is of the contents of the word-processing computer file.

11. The system of claim 6 wherein the video display device receives displayable signals only through the first data-processing device.

12. The system of claim 11 wherein the video display device is the sole display device for the first data-processing device and the second data-processing device.

13. A method of sharing peripheral devices, the method comprising:
  receiving, at a first data-processing device that is a telephone, a first user-input signal from a first user-input device, wherein the telephone comprises an external interface to a first user-input signal;
  executing a state machine at the first data-processing device that determines whether the first user-input signal is intended for the first data-processing device;
  enabling by the first data-processing device a shared use, as between the first data-processing device and a second data-processing device that is separate from the first data-processing device, of at least one peripheral device, wherein the first user-input device and a video display device are both peripheral devices, and further wherein (i) when the first user-input signal is intended for the first data-processing device, processing the first user-input signal into a first displayable signal that is transmittable to the video display device, and (ii) when the first user-input signal is intended for the second data-processing device, transmitting the first user-input signal to the second data-processing device;
  receiving by the first data-processing device a second displayable signal from the second data-processing device; and
  modifying the received second displayable signal, resulting in the first displayable signal such that the first displayable signal comprises at least part of the second displayable signal.

14. The method of claim 13 further comprising handling a telephone call by the first data-processing device, wherein the handling results in a third displayable signal for the video display device.

15. The method of claim 14 wherein the third displayable signal is of a dialed digit of a telephone number of the telephone call.

16. The method of claim 14 wherein the second data-processing device is for performing a computing function, wherein the computing function results in the second displayable signal.

17. The method of claim 16 wherein the computing function is the opening of a word-processing computer file and the second displayable signal is of result is of the contents of the word-processing computer file.

18. The method of claim 13 wherein the video display device receives displayable signals only through the first data-processing device.

19. The method of claim 18 wherein the video display device is the sole display device for the first data-processing device and the second data-processing device.

* * * * *